H. D. JAMES.
MOTOR CONTROL SYSTEM.
APPLICATION FILED MAR. 13, 1920.
1,438,649.
Patented Dec. 12, 1922.
2 SHEETS—SHEET 1.
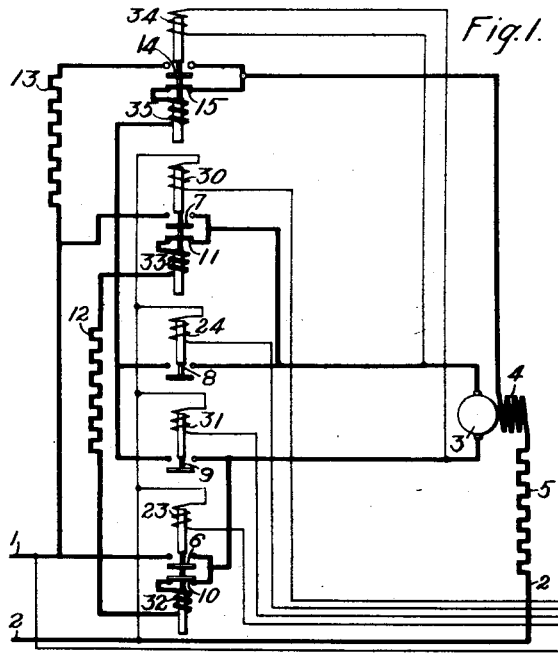
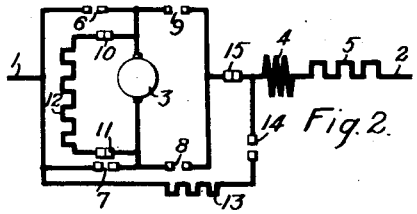
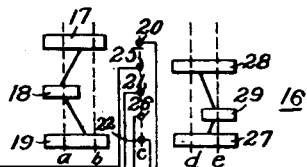
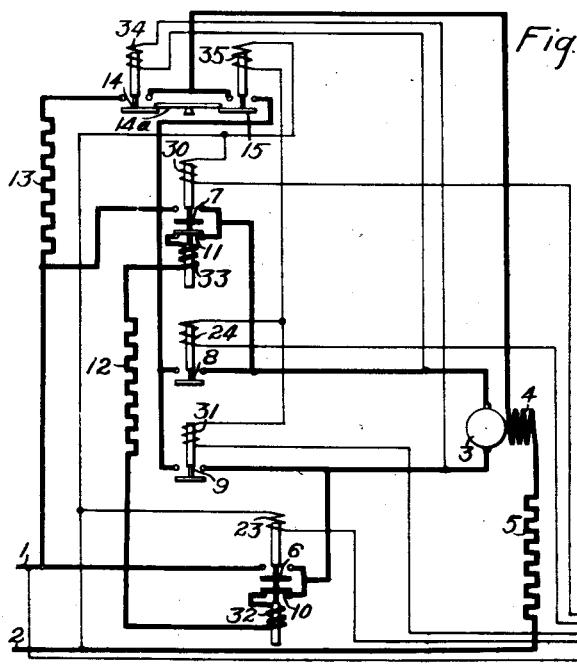
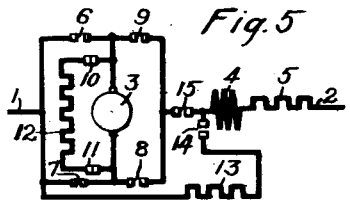
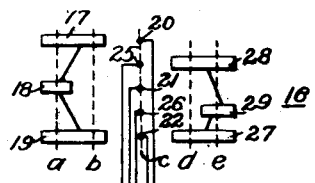
WITNESSES:
J. A. Helsel.
H. C. Lowe
INVENTOR
Henry D. James.
BY
Wesley G. Carr
ATTORNEY

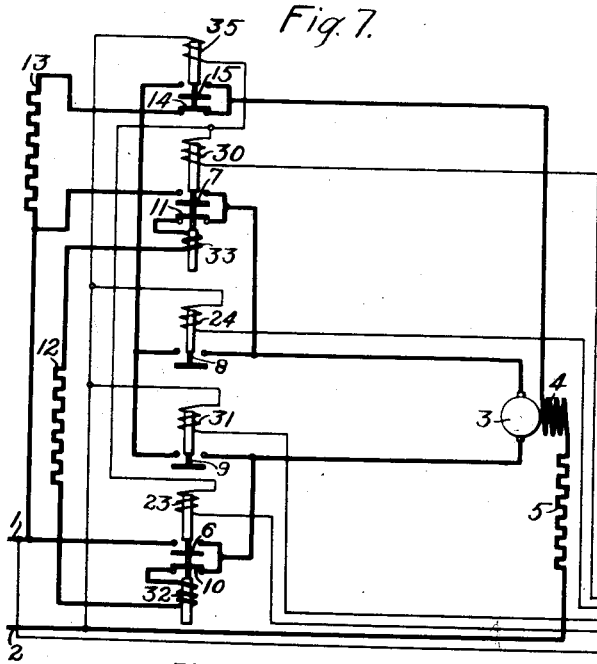

Patented Dec. 12, 1922.

1,438,649

UNITED STATES PATENT OFFICE.

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed March 13, 1920. Serial No. 365,467.

*To all whom it may concern:*

Be it known that I, HENRY D. JAMES, a citizen of the United States, and a resident of Edgewood Park, in the county of Allegheny and State of Pennsylvania, have invented a new and useful Improvement in Motor-Control Systems, of which the following is a specification.

My invention relates to motor-control systems and particularly to such systems as are employed to effect the dynamic braking of series electric motors.

One object of my invention is to provide a dynamic brake for rapidly diminishing the speed of rotation of a series electric motor with the least possible wear and injury thereto.

A second object of my invention is to provide a system wherein a master switch may be quickly thrown from an operative position to a position corresponding to the reverse direction of operation of the motor without injury thereto.

A third object of my invention is to provide automatic means for effecting the dynamic braking of a series electric motor upon a sudden failure of the supply of electrical energy.

In a system embodying my invention, the same number of contactors are employed as are used with a standard reversing controller, and dynamic braking is effected by employing a dynamic braking circuit which includes a resistor, switches that coact with the directional switches, a main-line switch, and a circuit including a switch which may coact with the directional switches or the main-line switch for energizing the series field magnet winding during dynamic braking.

In the accompanying drawing, Figs. 1, 4, 7 and 10 are diagrammatic views of various circuits and apparatus embodying my invention; Figs. 2, 5, 8 and 11 are schematic diagrams, corresponding respectively, to Figs. 1, 4, 7 and 10; and Figs. 3, 6, 9 and 12 are sequence charts indicating the sequence of operation of the several contactors provided for controlling the respective circuits and apparatus shown in Figs. 1, 4, 7 and 10.

Referring particularly to Figs. 1, 2 and 3, line conductors 1 and 2, which may be connected to any suitable source of energy, supply current to an electric motor, the armature of which is indicated at 3 and which has a series field-magnet winding 4. A starting resistor 5 is in series with the motor. If it is so desired, a portion or all of the resistor 5 may be shunted during the normal operation of the motor, but such arrangement is not material to the present invention.

The direction of operation of the motor is controlled by the directional switches 6, 7, 8 and 9. A dynamic-braking circuit comprises a pair of auxiliary switches 10 and 11 which are mechanically interlocked with reversing switches 6 and 7, respectively, and a resistor 12.

A shunt circuit for the series field-magnet winding 4 comprises a resistor 13 and an auxiliary switch 14. The switch 14 is mechanically interlocked with a main-line switch 15.

A master switch 16 comprises electrically-connected contact segments 17, 18 and 19 that respectively engage contact fingers 20, 21 and 22, when they are moved to forward position "a," thereby energizing actuating coils 23 and 24 of the respective switches 6 and 8. The contact finger 22 is supplied with electrical energy from the line conductor 1. Contact fingers 22, 25 and 26 respectively coact with electrically-connected contact segments 27, 28 and 29 to control the actuating coils 30 and 31 of switches 7 and 9, respectively.

The dynamic-braking switches 10 and 11 have holding coils 32 and 33, respectively. The switch 14 has an actuating coil 34, and the line switch 15 is provided with a holding coil 35.

When the master switch 16 is in its "Off" position "c," the switches 6, 7, 8 and 9 are open, and the dynamic-braking switches 10 and 11 are closed, as they are mechanically interlocked, respectively, with reversing switches 6 and 7.

If it is desired to operate the motor in a forward direction and the master switch 16 is in its "Off" position "c" shown in the drawing, the master switch is moved to position "b". In position "b", the contact fingers 20 and 22 engage, respectively, the contact segments 17 and 19, and the switch coil 23 is energized and the switch 6 closed and the dynamic-brake switch 10 is opened. The positions of the various switches in the several positions of the master switch are indicated in the sequence chart of Fig. 3.

By continuing the movement of the contact fingers to position "a", the contact finger 21 engages the contact segment 18, thereby energizing coil 24 which actuates switch 8. The main-line switch 15 is in the closed position it assumes when the switch 14 is open. The circuit of the motor is thus completed by the closing of the switches 6, 8 and 15, for operation of the motor in its forward direction.

If it is desired to permit the motor to drift, the master switch is actuated to position "b", thereby disengaging the contact finger 21 from contact segment 18. This disengagement de-energizes the coil 24, thereby opening the switch 8 and breaking the main-line circuit.

If it is desired to effect dynamic braking of the motor, the contact fingers 20 and 22 are also disengaged by moving the switch arm to position "c", thereby de-energizing the coil 23 and opening the switch 6. The switch 10 is closed by the opening of the switch 6 and, as the switch 11 is also closed, the dynamic-braking circuit, comprising the resistor 12, is completed. The difference in potential of the armature conductors is sufficient to energize the coil 34 and, since holding coil 35 is not energized, the switch 14, which completes a shunt circuit for the series field-magnet winding 4, is closed. The motor is then brought quickly to rest.

When the armature 3 no longer rotates, the coil 34 is de-energized and the switch 14 opens, thereby opening the shunt circuit including the series field-magnet winding 4.

The motor is operated in a reverse direction by actuating the master switch to position "e" and thereby engaging the contact fingers 22, 25 and 26 with the respective contact segments 27, 28 and 29 and thus energizing the actuating coils 30 and 31 of switches 7 and 9. The reversing circuit is completed upon the closing of switches 7 and 9, the main-line switch 15 being in its closed position, when the coil 34 of the switch 14 is not energized, or, if the coil 35 is energized, it will maintain the switch 15 in a closed position though the coil 34 is also energized.

The motor may be permitted to drift by moving the master switch to position "d". In this position, as the contact finger 26 does not engage the contact segment 29, the coil 31 is de-energized and the switch 9 is opened. The switches 8, 9, 11 and 14 being open, no current traverses the armature 3 and the series field magnet winding 4, and, therefore, there is no braking action.

By returning the master switch to position "c", the switches 6, 7, 8, 9 and 15 are opened and dynamic braking switches 10 and 11 and the switch 14 are closed. The closing of the switch 14 completes the shunt circuit for the series field-magnet winding 4, thereby causing the motor to act as a generator, if the armature 3 is rotating. When the armature 3 no longer rotates, the coil 34 is de-energized, the switch 14 opens and the line switch 15 closes.

Referring particularly to Figs. 4, 5 and 6, the system illustrated therein is similar to the one shown by the corresponding Figs. 1, 2 and 3, except that line switch 15 is so mechanically interlocked with the switch 14, which controls the shunt circuit of the series field-magnet winding 4, that a pivotally mounted bar 14a prevents them from being in their closed positions simultaneously.

The corresponding contact fingers engage the contact segments of the master switch, in the same manner as in the system of Figs. 1, 2 and 3, when the master switch is actuated either to its forward position "a", to its reverse position "e", or to its position for effecting dynamic braking. The switches are arranged differently to secure forward and reverse drifting and when the motor is stationary. The switch 15 will be in its closed position only when coil 24 or coil 31 which actuate switches 8 and 9 respectively, are energized. Otherwise, it is opened by gravity.

When the master switch is in position "b", the switches 6, 11 and 14 are closed and the motor drifts in a forward direction. In this position, the switch 15 is open, for the coil 35 is de-energized and the difference in potential of the armature terminals is sufficient to energize the coil 34 to close the switch 14, whereas, under similar conditions in the system of Figs. 1, 2 and 3, switch 15 is closed and switch 14 is open.

Dynamic braking is secured by bringing the master switch into position "c", thereby opening switch 6 and closing auxiliary switch 10 which is interlocked therewith. The positions of the several switches in the "Off" position of the master switch differs from those of the previous arrangement as only the switches 10 and 11 are closed in this arrangement.

When the master switch is in position "d" to secure the drifting of the motor in the reverse direction, switches 7, 10 and 14 are closed. This arrangement differs from the operation of the system shown in Figs. 1, 2 and 3, as the switch 15 is closed and switch 14 is open in the first system. The second arrangement maintains the series field-magnet winding energized when the motor is drifting, thereby ensuring quicker braking.

Referring particularly to Figs. 7 and 8, the arrangement of the switches is the same as in the system of Figs. 1 and 2, except that the switch 14 is closed by gravity and is opened upon the closing of the switch 15.

Therefore, the actuating coil 34 need not be provided.

The contact fingers 20, 21, 25 and 26 are electrically connected to conductors which respectively energize actuating coils 30, 31, 23 and 24 of the corresponding switches 7, 9, 6 and 8. The coil 35 is so electrically connected to coils 23 and 30 that it is energized when either of the latter coils is energized. Therefore, switch 15 is closed, if either of the switches 6 and 7 is closed.

The dynamic-braking switches 10 and 11 are controlled in the manner described in connection with the system of Fig. 1.

Referring particularly to Fig. 9, the sequence of operation is shown in the chart. When the master switch is in position "a", the reversing switches 7 and 9 and the main-line switch 15 are closed and thus the armature and series field-magnet winding circuits are completed and the motor operated in the reverse position.

If the master switch be moved from position "a" to position "b", the contact finger 21 is disengaged from the contact segment 18, thereby de-energizing coil 31, which actuates directional switch 9. The armature 3 and series field-magnet winding 4 are de-energized by the opening of switch 9, and the motor may "drift".

If the master switch be moved from position "b" to position "c", the contact finger 20 will be disengaged from contact segment 17, thereby de-energizing coils 30 and 35, and thus opening switches 7 and 15 and causing the switches 11 and 14 to close. The switches 10, 11 and 14 being closed, dynamic braking is effected. By moving the master switch to position "e", the switches 6, 8, 11 and 15 are closed and the motor rotates in a forward direction.

Forward drifting may be secured by moving the contact fingers to position "d", in which position the contact finger 26 does not engage contact segment 29, and, therefore, the switch 8 is open.

Referring particularly to Figs. 10, 11 and 12, the reversing switches 6, 7, 8 and 9 and the master switch 16 are arranged similarly to those shown in the preceding figures.

The dynamic-braking circuit, comprising the auxiliary switches 10 and 11 and the resistors 12, is shown in a somewhat different arrangement than in the preceding systems. This arrangement of the dynamic-braking circuit eliminates the necessity of one of the switches required in the preceding systems, though an additional switch 36 for shunting turns of the starting resistor 5 is shown with its actuating coil 37. This switch may be included in any one of the preceding systems, as it is employed only for starting the motor.

The actuating coils for switches 6, 7, 8, 9, 10 and 11 are designated by the same numerals that were applied to the corresponding coils in the preceding systems.

A main-line switch 38, provided with an actuating coil 39, performs the same function in this circuit that switch 15 does in each of the preceding systems. The switch 38 is not, however, mechanically interlocked with any other switch. There is no independent shunt circuit for the field-magnet winding 4 in this system, and, therefore, the switch 14 is not required.

The principal difference between this system and the previous systems is that no circuit is used solely for shunting the current around the armature to energize the winding 4 during dynamic braking, but dynamic braking is secured by disconnecting the armature 3 and winding 4 from an external source of electrical energy and connecting them and the resistors 12 in closed circuits.

Switches 40 and 41 are mechanically interlocked, respectively, with reversing switches 8 and 9. By means of the auxiliary switch 40, the control circuit, which includes contact finger 26 and the coils 23 and 39, cannot be completed until the switch 8 is closed. As the coils 23 and 39 respectively actuate switches 6 and 38, it is impossible to close switch 6 without first closing switch 8 and, if switch 6 is closed, switch 38 must be closed. In a similar manner, switch 41 prevents switch 7 from closing until switch 9 is closed and, if switch 7 is closed, switch 38 must also be closed.

When the master switch is in position "a", the contact segments 17, 18 and 19 are engaged, respectively, by contact fingers 20, 21 and 22, and thus the coils 31, 30 and 39 are energized to close directional switches 9 and 7 and the line switch 38, thereby causing the motor to rotate in the reverse position. Dynamic-braking switch 11 is opened by the closing of the switch 7, and the reversing switches 6 and 8 are held open by gravity when the coils 23 and 24 are not energized.

If the master switch be moved to position "c", which is both the drift and the off position, the contact fingers 20, 21 and 22 are disengaged from the corresponding contact segments 17, 18 and 19, thereby de-energizing coils 31, 30 and 39 and thus opening switches 9, 7 and 38. In this position, the dynamic-braking switches 10 and 11 only are closed.

If it is desired to employ the motor for dynamic braking, when the armature 3 is rotating in the reverse direction, the master switch is moved to position "d". In this position, the contact fingers 22 and 25 engage contact segments 27 and 28, thereby energizing coil 24, which actuates reversing switch 8. The dynamic-braking switches 10 and 11 being closed, as well as directional switch 8, a complete generator circuit is established. The current generated by the armature 3 traverses a circuit comprising the switch 8, the winding 4, the resistor 12 and the switch 10 to the armature 3, and also through a second circuit comprising the switch 11, both banks of resistance 12 and the switch 10 to the armature 3. The electrical energy generated by the motor is expended in the resistors 12.

By moving the master switch from position "d" to position "e", the circuits are arranged for the forward direction of rotation of the motor. The contact finger 26 engages the contact segment 29, thus energizing coils 23 and 39, which actuates switches 6 and 38. The switches 6, 8 and 38 being closed, and the remaining switches being open with the exception of the dynamic-braking switch 11 and the auxiliary switch 40, the motor rotates in a forward direction.

If dynamic braking is desired, when the motor is rotating in a forward direction, the master switch is moved in a reverse direction from position "e" to position "b". All of the switches, except dynamic-braking switches 10 and 11, are released as the contact fingers pass through the "Off" position "c". At position "b", the contact fingers 20 and 22 engage the contact segments 17 and 19, thereby energizing the actuating coil 31 and closing the switch 9.

The coil 37, that actuates switch 36, is energized by conductors that electrically connect with the conductors of the armature 3. By means of this arrangement, the starting resistor 5 is not shunted until the potential across the terminals of the armature 3 is sufficient to close the switch 36.

I have invented four systems of control in which a series motor may be permitted to drift before dynamic braking is applied. This order in the sequence of operation of the motor is desirable, for the operator of a car or machine, by permitting the motor to drift and then applying dynamic braking, can bring the car or machine to a stop nearer a predetermined point, than, if dynamic braking first occurs. It is apparent that power and wear on the equipment are lessened by having drifting precede dynamic braking of the motor.

In all four of these systems, dynamic braking is secured without "plugging" the motor. Therefore, the car or machine will not reverse its direction after coming to a complete stop, as would occur in the systems of control for series motors formerly employed.

In the last system of control, I have shown the dynamic braking positions of the master switch nonadjacent to their corresponding operative positions, therefore, dynamic braking does not occur, if the master switch is slightly removed from one of the operative positions and the direction of operation of the motor can be quickly changed by continuing the movement of the master switch to its next position.

From the construction and operation of my control systems herein described, it is apparent that their principal advantages are the simplicity of control from the master switch and that quick dynamic braking is secured.

While I have shown preferred forms of my invention, it is apparent that slight modifications may be made without departing from the spirit thereof, I desire, therefore, to be limited only by the scope of the appended claims.

I claim as my invention:

1. In a motor-control system, the combination with a series electric motor having an armature and a field-magnet winding and a plurality of directional switches for controlling the direction of operation of said motor, of means comprising a circuit for effecting dynamic braking thereof, a plurality of switches coacting with said directional switches for controlling said circuit, and means independent of said armature for energizing said field-magnet winding during dynamic braking.

2. In a motor-control system, the combination with a series electric motor having a series field-magnet winding and a plurality of directional switches for controlling the direction of operation of the said motor, of a dynamic-braking circuit, and means comprising a master switch for controlling the connections of said elements for normal operation in one position, and for dynamic braking in another, and for drifting in either direction in an intermediate position.

3. In a motor-control system, the combination with a series electric motor having a series field-magnet winding and a plurality of directional switches for controlling the direction of operation of the said motor, of a dynamic braking circuit, and means comprising a master controller having a plurality of operating positions for effecting drifting of said motor upon said controller being actuated from an operating position to a position between said operating position and the corresponding dynamic-braking position.

4. In a motor-control system, the combination with a series electric motor having an armature and a series field-magnet winding and directional switches therefor, a dynamic-braking circuit and switches for controlling the said braking circuit, of a field circuit for energizing said field-magnet winding when effecting dynamic braking and a switch controlled by the operation of said directional switches for opening and closing said field circuit.

5. In a motor-control system, the combination with a series electric motor having an armature and a series field-magnet winding, a dynamic-braking circuit comprising said armature for effecting dynamic braking of said motor, a line switch for controlling the operation of said motor, of a field circuit for independently energizing said field-magnet winding when effecting dynamic braking and a switch coacting with said line switch for controlling said field circuit.

6. The combination with a motor having an armature and a series field-magnet winding and a resistor, of means for connecting said armature to said resistor during dynamic braking, a plurality of directional contactors for reversing the connections of said armature to said field-magnet winding, a supply source of energy, means comprising a switch for connecting said motor to said source during normal operation and means comprising a contactor for connecting said field winding to said source during dynamic braking.

7. The combination with a motor having an armature and a series field-magnet winding and a resistor, of means for connecting said armature to said resistor during dynamic braking, a plurality of directional contactors for reversing the connections of said armature to said field-magnet winding, a supply source of energy, means comprising a switch for connecting said motor to said source during normal operation and means comprising a resistor and a contactor for connecting said field winding to said source during dynamic braking.

8. The combination with a motor having an armature and a series field-magnet winding and a resistor, of means for connecting said armature to said resistor during dynamic braking, a plurality of directional contactors for reversing the connections of said armature to said field-magnet winding, a supply source of energy, means comprising a switch for connecting said motor to said source during normal operation and means comprising a resistor and a contactor for connecting said field winding to said source during dynamic braking, said contactor being electrically interlocked with certain of said directional contactors.

9. In a motor-control system, the combination with a series electric motor having an armature and a series field-magnet winding and directional switches therefor, of a dynamic braking circuit, of a field circuit for energizing said field-magnet winding when effecting dynamic braking and a switch controlled by the operation of said directional switches and the voltage across said armature for opening and closing said field circuit.

In testimony whereof, I have hereunto subscribed my name this 5th day of March 1920.

HENRY D. JAMES.